(12) United States Patent
Lumineau et al.

(10) Patent No.: US 8,879,920 B2
(45) Date of Patent: Nov. 4, 2014

(54) WAVELENGTH MULTIPLEXED OPTICAL SYSTEM WITH MULTIMODE OPTICAL FIBERS

(75) Inventors: Yves Lumineau, Herblay (FR); Denis Molin, Draveil (FR); Asghar Gholami, Isfahan (IR)

(73) Assignee: Draka Comteq, B.V., Amsterdam (NL)

( * ) Notice: Subject to any disclaimer, the term of this patent is extended or adjusted under 35 U.S.C. 154(b) by 229 days.

(21) Appl. No.: 12/489,995

(22) Filed: Jun. 23, 2009

(65) Prior Publication Data

US 2010/0021170 A1 Jan. 28, 2010

(30) Foreign Application Priority Data

Jun. 23, 2008 (FR) ...................................... 08 03489

(51) Int. Cl.
*H04J 14/02* (2006.01)
*H04B 10/00* (2013.01)
*H04B 10/12* (2006.01)
*H04B 10/2581* (2013.01)

(52) U.S. Cl.
CPC ............. *H04J 14/0279* (2013.01); *H04J 14/02* (2013.01); *H04B 10/2581* (2013.01)
USPC ............. 398/148; 398/81; 398/140; 398/141; 398/142; 398/143; 398/144; 398/147; 398/149; 398/150; 398/158; 398/159

(58) Field of Classification Search
None
See application file for complete search history.

(56) References Cited

U.S. PATENT DOCUMENTS

| | | | |
|---|---|---|---|
| 4,111,525 A | 9/1978 | Kaminow et al. | |
| 4,184,744 A | 1/1980 | Onoda et al. | |
| 4,222,631 A | 9/1980 | Olshansky | |
| 4,229,070 A | 10/1980 | Olshansky et al. | |
| 4,230,396 A | 10/1980 | Olshansky et al. | |
| 4,339,174 A | 7/1982 | Levin | |
| 4,406,517 A | 9/1983 | Olshansky | |
| 4,465,335 A | 8/1984 | Eppes | |
| 4,636,235 A | 1/1987 | Glessner et al. | |
| 4,636,236 A | 1/1987 | Glessner et al. | |
| 4,653,042 A * | 3/1987 | d'Auria et al. ................... | 398/91 |

(Continued)

FOREIGN PATENT DOCUMENTS

| | | |
|---|---|---|
| EP | 1921478 A1 | 5/2008 |
| EP | 2139128 A1 | 12/2009 |

(Continued)

OTHER PUBLICATIONS

Guan et al., "Multimode Fibers for Compensating Intermodal Dispersion of Graded-Index Multimode Fibers", Jul. 2004, Journal of Lifhtwave Technology, vol. 22, No. 7, pp. 1714-1719.*

(Continued)

*Primary Examiner* — Darren E Wolf
(74) *Attorney, Agent, or Firm* — Additon, Higgins & Pendleton, P.A.

(57) ABSTRACT

The present wavelength multiplexed optical system includes a multimode optical fiber that transmits wavelength multiplexed optical signals and a plurality of multimode modal dispersion compensation optical fibers. Each modal dispersion compensation optical fiber can transmit one of the multiplex wavelengths, and each modal dispersion compensation optical fiber has an optimized index profile such that the modal dispersion for the transmitted wavelength is approximately inversely equal to the modal dispersion induced in the multimode optical fiber. The wavelength multiplexed optical system facilitates an increased bitrate without reducing bandwidth.

20 Claims, 4 Drawing Sheets

(56) References Cited

U.S. PATENT DOCUMENTS

| | | |
|---|---|---|
| 4,715,695 A | 12/1987 | Nishimura et al. |
| 4,723,828 A | 2/1988 | Lowe et al. |
| 4,838,643 A | 6/1989 | Hodges et al. |
| 5,142,603 A | 8/1992 | Forrester |
| 5,278,687 A * | 1/1994 | Jannson et al. .............. 398/79 |
| 5,381,503 A | 1/1995 | Kanamori et al. |
| 5,574,816 A | 11/1996 | Yang et al. |
| 5,702,497 A | 12/1997 | Oh et al. |
| 5,717,805 A | 2/1998 | Stulpin |
| 5,761,362 A | 6/1998 | Yang et al. |
| 5,841,933 A | 11/1998 | Hoaglin et al. |
| 5,911,023 A | 6/1999 | Risch et al. |
| 5,982,968 A | 11/1999 | Stulpin |
| 6,002,818 A | 12/1999 | Fatehi et al. |
| 6,035,087 A | 3/2000 | Bonicel et al. |
| 6,066,397 A | 5/2000 | Risch et al. |
| 6,085,009 A | 7/2000 | Risch et al. |
| 6,134,363 A | 10/2000 | Hinson et al. |
| 6,175,677 B1 | 1/2001 | Yang et al. |
| 6,181,857 B1 | 1/2001 | Emeterio et al. |
| 6,185,346 B1 | 2/2001 | Asawa et al. |
| 6,210,802 B1 | 4/2001 | Risch et al. |
| 6,215,931 B1 | 4/2001 | Risch et al. |
| 6,292,603 B1 * | 9/2001 | Mizuochi et al. .............. 385/24 |
| 6,292,612 B1 | 9/2001 | Golowich et al. |
| 6,314,224 B1 | 11/2001 | Stevens et al. |
| 6,321,012 B1 | 11/2001 | Shen |
| 6,321,014 B1 | 11/2001 | Overton et al. |
| 6,334,016 B1 | 12/2001 | Greer, IV |
| 6,363,195 B1 | 3/2002 | Abbott, III et al. |
| 6,381,390 B1 | 4/2002 | Hutton et al. |
| 6,422,043 B1 | 7/2002 | DiGiovanni et al. |
| 6,470,126 B1 | 10/2002 | Mukasa |
| 6,486,993 B1 | 11/2002 | Kuroshima |
| 6,493,491 B1 | 12/2002 | Shen et al. |
| 6,525,853 B1 | 2/2003 | Stuart |
| 6,542,679 B2 | 4/2003 | DiGiovanni et al. |
| 6,580,863 B2 | 6/2003 | Yegnanarayanan et al. |
| 6,603,908 B2 | 8/2003 | Dallas et al. |
| 6,606,437 B1 | 8/2003 | Mukasa et al. |
| 6,618,538 B2 | 9/2003 | Nechitailo et al. |
| 6,658,184 B2 | 12/2003 | Bourget et al. |
| 6,724,965 B2 | 4/2004 | Abbott et al. |
| 6,724,966 B2 | 4/2004 | Mukasa |
| 6,735,985 B2 | 5/2004 | DiGiovanni et al. |
| 6,749,446 B2 | 6/2004 | Nechitailo |
| 6,750,294 B2 | 6/2004 | Sugiyama et al. |
| 6,771,865 B2 | 8/2004 | Blaszyk et al. |
| 6,790,529 B2 | 9/2004 | Pleunis et al. |
| 6,904,218 B2 | 6/2005 | Sun et al. |
| 6,912,347 B2 | 6/2005 | Rossi et al. |
| 6,922,515 B2 | 7/2005 | Nechitailo et al. |
| 6,941,049 B2 | 9/2005 | Risch et al. |
| 7,006,751 B2 | 2/2006 | Provost et al. |
| 7,043,126 B2 | 5/2006 | Guan et al. |
| 7,043,128 B2 | 5/2006 | DiGiovanni et al. |
| 7,045,010 B2 | 5/2006 | Sturman, Jr. |
| 7,089,765 B2 | 8/2006 | Schaper et al. |
| 7,139,457 B2 | 11/2006 | Guan et al. |
| 7,162,128 B2 | 1/2007 | Lovie et al. |
| 7,242,870 B2 | 7/2007 | Guan et al. |
| 7,315,677 B1 | 1/2008 | Li et al. |
| 7,322,122 B2 | 1/2008 | Overton et al. |
| 7,346,244 B2 | 3/2008 | Gowan et al. |
| 7,356,234 B2 | 4/2008 | de Montmorillon et al. |
| 7,400,835 B2 | 7/2008 | Sardesai et al. |
| 7,406,235 B2 | 7/2008 | Guan et al. |
| 7,421,172 B2 | 9/2008 | Matthijsse et al. |
| 7,421,174 B2 | 9/2008 | Fleming, Jr. et al. |
| 7,483,613 B2 | 1/2009 | Bigot-Astruc et al. |
| 7,515,795 B2 | 4/2009 | Overton et al. |
| 7,539,381 B2 | 5/2009 | Chen et al. |
| 7,555,186 B2 | 6/2009 | Flammer et al. |
| 7,567,739 B2 | 7/2009 | Overton et al. |
| 7,570,852 B2 | 8/2009 | Nothofer et al. |
| 7,587,111 B2 | 9/2009 | de Montmorillon et al. |
| 7,599,589 B2 | 10/2009 | Overton et al. |
| 7,623,747 B2 | 11/2009 | de Montmorillon et al. |
| 7,639,915 B2 | 12/2009 | Parris et al. |
| 7,646,952 B2 | 1/2010 | Parris |
| 7,646,954 B2 | 1/2010 | Tatat |
| 7,646,955 B2 | 1/2010 | Donlagic |
| 7,783,149 B2 | 8/2010 | Fini |
| 7,787,731 B2 | 8/2010 | Bookbinder et al. |
| 7,817,257 B2 | 10/2010 | Takenaga et al. |
| 7,826,691 B2 | 11/2010 | Matthijsse et al. |
| 7,865,050 B1 | 1/2011 | Sun et al. |
| 7,878,712 B2 | 2/2011 | Shimotakahara et al. |
| 7,903,918 B1 | 3/2011 | Bickham et al. |
| 2002/0102082 A1 | 8/2002 | Sarchi et al. |
| 2002/0176678 A1 | 11/2002 | Mukasa |
| 2002/0197038 A1 | 12/2002 | Abbott et al. |
| 2003/0024276 A1 | 2/2003 | Anderson et al. |
| 2004/0042799 A1 | 3/2004 | Sardesai et al. |
| 2004/0184492 A1 | 9/2004 | Windover |
| 2005/0008312 A1 | 1/2005 | Jang et al. |
| 2007/0127878 A1 | 6/2007 | de Montmorillon et al. |
| 2007/0172182 A1 | 7/2007 | Lee et al. |
| 2007/0183726 A1 | 8/2007 | Nothofer et al. |
| 2007/0280615 A1 | 12/2007 | de Montmorillon et al. |
| 2008/0037942 A1 | 2/2008 | Tatat |
| 2008/0145010 A1 | 6/2008 | Overton et al. |
| 2008/0152288 A1 | 6/2008 | Flammer et al. |
| 2008/0181564 A1 | 7/2008 | Overton et al. |
| 2008/0292262 A1 | 11/2008 | Overton et al. |
| 2009/0003779 A1 | 1/2009 | Parris |
| 2009/0003781 A1 | 1/2009 | Parris et al. |
| 2009/0003785 A1 | 1/2009 | Parris et al. |
| 2009/0041414 A1 | 2/2009 | Lavenne et al. |
| 2009/0059353 A1 | 3/2009 | Fini |
| 2009/0092365 A1 | 4/2009 | Donlagic |
| 2009/0154888 A1 | 6/2009 | Abbott, III et al. |
| 2009/0169163 A1 | 7/2009 | Abbott, III et al. |
| 2009/0175583 A1 | 7/2009 | Overton |
| 2009/0214167 A1 | 8/2009 | Lookadoo et al. |
| 2009/0252469 A1 | 10/2009 | Sillard et al. |
| 2009/0279835 A1 | 11/2009 | de Montmorillon et al. |
| 2009/0279836 A1 | 11/2009 | de Montmorillon et al. |
| 2009/0297107 A1 | 12/2009 | Tatat |
| 2010/0021170 A1 | 1/2010 | Lumineau et al. |
| 2010/0028020 A1 | 2/2010 | Gholami et al. |
| 2010/0040336 A1 | 2/2010 | Chen et al. |
| 2010/0067858 A1 | 3/2010 | Kim et al. |
| 2010/0171945 A1 | 7/2010 | Gholami et al. |
| 2010/0220966 A1 | 9/2010 | Bennett |
| 2010/0254653 A1 | 10/2010 | Molin et al. |
| 2010/0310218 A1 | 12/2010 | Molin et al. |
| 2011/0002590 A1 | 1/2011 | Ooizumi et al. |
| 2011/0037183 A1 | 2/2011 | Tudury et al. |
| 2011/0044594 A1 | 2/2011 | Tudury et al. |
| 2011/0044596 A1 | 2/2011 | Zhang et al. |
| 2011/0054861 A1 | 3/2011 | Lane |
| 2011/0054862 A1 | 3/2011 | Pimpinella et al. |
| 2011/0058781 A1 | 3/2011 | Molin et al. |
| 2011/0064367 A1 | 3/2011 | Molin et al. |
| 2011/0123161 A1 | 5/2011 | Molin et al. |
| 2011/0123162 A1 | 5/2011 | Molin et al. |
| 2011/0135262 A1 | 6/2011 | Molin et al. |
| 2011/0135263 A1 | 6/2011 | Molin et al. |
| 2011/0217012 A1 | 9/2011 | Bigot-Astruc et al. |

FOREIGN PATENT DOCUMENTS

| | | |
|---|---|---|
| EP | 2144096 A1 | 1/2010 |
| JP | 08-304636 A | 11/1996 |
| JP | 09-048629 | 2/1997 |
| JP | 11-064665 A | 3/1999 |
| JP | 2000-347057 A2 | 12/2000 |
| JP | 2003-47057 A2 | 12/2000 |
| JP | 2002-318315 A | 10/2002 |
| JP | 2006-047719 A | 2/2006 |
| JP | 2006-078543 A | 3/2006 |
| JP | 2006227173 | 8/2006 |
| WO | 03/081301 A1 | 10/2003 |

(56) References Cited

FOREIGN PATENT DOCUMENTS

| WO | 2005/106544 | A1 | 11/2005 |
|---|---|---|---|
| WO | 2007013923 | A2 | 2/2007 |
| WO | 2009/062131 | A1 | 5/2009 |
| WO | 2009062131 | A1 | 5/2009 |
| WO | 2009/078962 | A1 | 6/2009 |
| WO | 2010/036684 | A2 | 4/2010 |
| WO | 2011/040830 | A1 | 4/2011 |

OTHER PUBLICATIONS

Pepeljugoski et al., "15.6-Gb/s Transmission Over 1 km of Next Generation Multimode Fiber", IEEE Photonics Technology Letters, vol. 14, No. 5, May 2002.*

Chakma, "Optical Signal to Noise Ratio (OSNR)," International University Bremen, (2005), pp. 1-18.

Yam et al., "High-Speed Data Transmission Over a 1 KM Broad Wavelength Window Multimode Fiber," Optics Letters, OSA, Optical Society of America, Washington, DC, vol. 31, No. 13, Jul. 1, 2006, pp. 1954-1956.

Sasaki, P.L. Francois, D.N. Payne, "Accuracy and resolution of preform index-profiling by the spatial-filtering method," ECOC'81, 6.4-1, Copenhagen, Denmark.

Kashima et al., "Transmission characteristics of graded-index optical fibers with a lossy outer layer," Applied Optics USA, vol. 17, No. 8, Apr. 15, 1978.

Jacomme, "Modal dispersion in multimode graded-index fibers," Applied Optics USA, vol. 14, No. 11, Nov. 1, 1975, pp. 2578-2584.

Okamoto et al., "Computer-Aided Synthesis of the Optimum Refractive-Index Profile for a Multimode Fiber," IEEE Transaction on Microwave Theory and Techniques, USA, vol. MTT-25, No. 3, Mar. 1977, pp. 1-10.

Donalagic, "Opportunities to Enhance Multimode Fiber Links by Application of Overfilled Launch," Journal of Lightwave Technology, vol. 23, No. 11, (Nov. 2005) pp. 3526-3540.

Morikuni et al., "Simulation-Based Prediction of Multimode Fiber Bandwidth for 10 Gb/s Systems," LEOS 2002, 15th Annual Meeting of IEEE Lasers & Electro-Optics Society, Glasgow, Scotland, pp. 1-2.

Gloge et al., "Multimode theory of graded-core fibers," Bell System Technical Journal 1973, pp. 1563-1578.

Yabre, "Comprehensive theory of dispersion in graded-index optical fibers," Journal of Lightwave Technology, Feb. 2000, vol. 18, No. 2, pp. 166-177.

Panicker et al., "10 x 10 Gb/s DWDM transmission through 2.2-km multimode fiber using adaptive optics," IEEE Photonics Technology Letters, vol. 19, No. 15, pp. 1154-1156 published Aug. 1, 2007.

French Search Report in counterpart French Application No. 08/03489 dated Jan. 30, 2009.

European Search Report in counterpart European Application No. EP 09007985 dated Aug. 28, 2009.

European Office Action in counterpart European Application No. EP 09007985 dated Jul. 14, 2010.

U.S. Appl. No. 60/986,737 for a Microbend-Resistant Optical Fiber, filed Nov. 9, 2007.

U.S. Appl. No. 60/041,484 for a Microbend-Resistant Optical Fiber, filed Apr. 1, 2008.

U.S. Appl. No. 61/112,595 for a Microbend-Resistant Optical Fiber, filed Nov. 7, 2008.

U.S. Appl. No. 12/098,804 for a Transmission Optical Fiber Having Large Effective Area, filed Apr. 7, 2008.

U.S. Appl. No. 61/101,337 for a Bend-Insensitive Single-Mode Optical Fiber, filed Sep. 30, 2008.

U.S. Appl. No. 61/112,006 for a Bend-Insensitive Single-Mode Optical Fiber, filed Nov. 6, 2008.

U.S. Appl. No. 61/112,374 for a Bend-Insensitive Single-Mode Optical Fiber, filed Nov. 7, 2008.

Decision to grant a European Patent in counterpart European Application No. 09007985.6 dated Jul. 12, 2012, pp. 1-2.

European Patent Office Intention of Grant in counterpart European Application No. 09007985.6 dated Feb. 29, 2012, pp. 1-6.

Kaminow et al., "Profile synthesis in multicomponent glass optical fibers", Applied Optics, vol. 16, No. 1, Jan. 1, 1977, pp. 108-112.

Molin et al., "Low Bending Sensitivity of Regular OM3/OM4 Fibers in 10GbE Applications", Optical Fiber Communication (OFC) Collocated National Fiber Optic Engineers Conference, 2010 Conference on (OFC/NFOEC), IEEE, Piscataway, NJ, Mar. 21, 2010, pp. 1-3.

Freund, et al., "High-Speed Transmission in Multimode Fibers", Journal of Lightwave Technology, vol. 28, No. 4, Feb. 15, 2010, pp. 1-18.

* cited by examiner

FIG. 3a (comparative)

FIG. 3b (comparative)

WAVELENGTH MULTIPLEXED OPTICAL SYSTEM WITH MULTIMODE OPTICAL FIBERS

CROSS-REFERENCE TO PRIORITY APPLICATION

This application claims the benefit of pending French application Ser. No. 08/03489 for "Systeme Optique Multiplexe en Longueur D'ondes avec Fibres Optique Multimodes" (filed Jun. 23, 2008, at the French Patent Office), which is hereby incorporated by reference in its entirety.

FIELD OF THE INVENTION

The present invention relates to the field of optical fiber transmissions and, more specifically, to multimode fibers used for short-distance optical transmission systems that require large bandwidth.

BACKGROUND OF THE INVENTION

Multimode fibers are used for short-distance applications and local networks. The core of a multimode fiber generally has a diameter of approximately 50 microns (μm), compared with approximately 8 to 9 microns (μm) for the core of a single-mode fiber. Thus, for a particular wavelength, several optical modes propagate simultaneously along the fiber, carrying the same information. The bandwidth is directly linked to the group velocity of the optical modes propagating in the multimode core of the fiber. To guarantee a high bandwidth, it is necessary for the group velocities of all the modes to be identical. In other words, the intermodal dispersion (i.e., the difference in group velocity between the slower mode and the faster mode) should be minimized for a particular wavelength. The multimode fibers have been the subject of international standardization under standard ITU-T G.651, which, in particular, defines criteria (e.g., bandwidth, numerical aperture, and core diameter) that relate to the requirements for optical fiber compatibility.

To reduce the intermodal dispersion in a multimode fiber, it has been proposed since the 1970s to produce graded index fibers with a parabolic core profile. Such a fiber has been used for many years and its characteristics have been described in particular in the publications "*Multimode Theory of Graded-Core Fibers*" by D. Gloge et al., Bell System Technical Journal 1973, pp. 1563-1578, and "*Comprehensive Theory of Dispersion in Graded-Index Optical Fibers*" by G. Yabre, Journal of Lightwave Technology, February 2000, Vol. 18, No. 2, pp. 166-177.

A graded-index profile can be defined by a relationship between the index value n at a point as a function of the distance r from this point to the center of the fiber:

$$n = n_1 \sqrt{1 - 2\Delta\left(\frac{r}{a}\right)^\alpha}$$

wherein,
$\alpha > 0$ ($\alpha \to \infty$ corresponding to a step index profile);
$n_1$ is the maximum index of the multimode core;
a is the radius of the multimode core; and $$\Delta = \frac{(n_1^2 - n_0^2)}{2n_1^2}$$

wherein,
$n_0$ is the minimum index of the multimode core, generally corresponding to the index of the cladding (most often made of silica).

A multimode fiber with a graded index therefore has a core profile with a rotational symmetry such that along any radial direction the value of the index decreases continuously from the center of the fiber to its periphery. These curves are generally representative of the theoretical or target profile of the optical fiber, though fiber-manufacturing constraints may lead to a slightly different profile.

When a light signal propagates in such a core having a graded index, the different modes experience a different propagation medium, which affects their speed of propagation differently. By adjusting the value of the parameter α, it is therefore possible to theoretically obtain a group velocity that is virtually equal for all the modes and thus a reduced intermodal dispersion for a particular wavelength. A value for the parameter α of between 1.8 and 2.2 generally allows a satisfactory limitation of the modal dispersion.

That said, an optimum value of the parameter α is valid only for a particular wavelength. Thus, a multimode fiber typically transmits a monochromatic optical signal having a particular wavelength for which the alpha profile of the fiber has been optimized.

To date, high-bitrate transmission Ethernet networks are in operation, with bitrates of the order of 10 GbE (10 Gb/s). In order to provide such bitrates over more than 300 meters and 550 meters, respectively, it is necessary to guarantee an effective bandwidth greater than or equal to 2000 MHz-km and 4700 MHz-km, respectively. The standard TIA-492AAAC-A standardizes the required performances for 50 μm-diameter high-bitrate multimode fibers. However, the effective bandwidth (denoted by the acronym EMB for "Effective Modal Bandwidth") depends on the source used.

In a manner known per se, the effective bandwidth EMB is determined by a measurement of the delay caused by the modal dispersion, known as "Dispersion Mode Delay" (DMD) graphical representation. The procedure for measuring the DMD is the subject of standardization (IEC 60793-1-49 and FOTP-220).

A DMD graphical representation is obtained by injecting a light pulse having a particular wavelength $\lambda_0$ at the center of the fiber and by measuring the pulse delay after a particular fiber length L. The introduction of the light pulse of particular wavelength $\lambda_0$ is radially offset to cover the entire core of the multimode fiber. When the parameter α is set to an optimum value ($\alpha_{optimum}$), there is virtually no shift in the light pulse delay for a particular wavelength $\lambda_0$ regardless of the injection point of the pulse along the radius r of the fiber core; the intermodal dispersion is low and the effective bandwidth high.

However, this alignment on the DMD graphical representation of the light pulse delays regardless of the radius r, are only valid for a particular wavelength $\lambda_0$ for a particular value of the parameter α, $\alpha_{optimum}$. A multimode fiber is thus typically optimized to transmit a signal propagating at an optimum wavelength ($\lambda_{optimum}$). When a different wavelength pulse is transmitted in this same multimode fiber, the modal dispersion can become significant and restrict the bandwidth below the value of 2000 MHz-km required by the current standards.

There is thus a need for multimode telecommunication networks having bitrates greater than 10 GbE. It is sought to achieve bitrates of 40 GbE or even 100 GbE. It is however difficult to reach such bitrates with a single transmission channel. Nevertheless, for the foregoing reasons expressed, wavelength multiplexing is not possible directly in a multimode fiber.

Wavelength multiplexing, WDM for "Wavelength Division Multiplexing," consists of transmitting several light pulses of different wavelengths on a single optical fiber while combining them on input using a multiplexer (MUX) and separating them on output using a demultiplexer (DEMUX). Typically, dense multiplexing systems, DWDM for "Dense Wavelength Division Multiplexing," are used with single-mode fibers for which modal dispersion is non-existent, only the chromatic dispersion requiring compensation.

Thus, a wavelength multiplexing in a multimode fiber requires not only a compensation for the chromatic dispersion, but also a management of the modal dispersion.

The publication "10×10 Gb/s DWDM Transmission through 2.2-km Multimode Fiber Using Adaptive Optics" by R. A. Panicker et al., IEEE Photonics Technology Letters, Vol. 19, No. 15, pp. 1154-1156 published Aug. 1, 2007, proposes a wavelength multiplexing in a multimode optical fiber. An adaptive optics system is provided at the fiber input to shape the signal and minimize the modal dispersion. The adaptive optics system is however complex and costly, and designed to operate in the C band while most multimode applications are located around 850 nanometers.

U.S. Pat. No. 7,242,870 describes a WDM system comprising a multimode optical fiber transmitting a wavelength multiplexed signal. The multimode fiber is germanium-fluorine co-doped and has a controlled index profile in order to maximize the bandwidth in the 720 nanometer to 1400 nanometer transmission window. The profile and concentrations of dopants for producing such a fiber, however, are difficult to control and the cost of the fiber is thereby increased.

U.S. Pat. No. 6,525,853 describes a communication system in which N optical signals are combined for transmission in a single multimode fiber. An optical system is provided at the multimode fiber input and introduces a modal coupling diversity which, when combined with the modal dispersion of the fiber, introduces a decorrelation of the signals transmitted and received. This decorrelation makes it possible to retrieve the data flow of each signal transmitted by means of a suitable algorithm. However, the system described in this document is complex to implement.

U.S. Pat. No. 5,278,687 describes a bidirectional optical transmission system comprising a multimode optical fiber transmitting a wavelength multiplexed signal. The modal dispersion is simply ignored, which is prejudicial for the system bandwidth.

U.S. Pat. No. 6,363,195 proposes to compensate for the modal dispersion of a multimode optical link by using a concatenation of multimode fibers in order to optimize the bandwidth for two transmission windows, one centered on 850 nanometers and the other on 1300 nanometers. This document proposes to use a length of a first multimode fiber having a value of parameter $\alpha_1$ of between 0.8 and 2.1 to optimize the bandwidth at 850 nanometers and a length of a second multimode fiber having a value of parameter $\alpha_2$ between the first value $\alpha_1$ and 8 to optimize the bandwidth at 1300 nanometers. This document, however, makes no mention of a wavelength multiplexing.

Thus, there is a need for a multimode optical transmission system allowing a dense wavelength multiplexing (DWDM) for an increase in bitrate without reducing the bandwidth. Such an optical system must be uncomplicated and efficient, and must be implemented with a standard multimode transmission fiber.

SUMMARY OF THE INVENTION

To this end, the invention proposes to compensate for the modal dispersion of each multiplex channel having a wavelength that is different from the wavelength for which the profile of the multimode transmission fiber is optimized. For example, a plurality of fibers that compensate for modal dispersion may be introduced into the optical system to induce modal dispersion that offsets the modal dispersion caused by the multimode optical fiber's transmission of wavelength multiplexed optical signals.

The invention particularly relates to an optical system that includes a multimode transmission optical fiber for transmitting wavelength multiplexed optical signals (i.e., the multiplex) and a plurality of multimode modal dispersion compensation optical fibers. Each multimode modal dispersion compensation optical fiber is capable of transmitting at least one of the wavelengths of the multiplex (e.g., $\lambda_1, \lambda_2, \lambda_3 \ldots \lambda_n, \lambda_{n+1}$).

Moreover, each multimode modal dispersion compensation optical fiber typically possesses an optimized index profile such that its modal dispersion for a particular multiplex wavelength ($\lambda_m$) is substantially inversely equal to the modal dispersion induced in the multimode transmission optical fiber during the transmission of that particular multiplex wavelength ($\lambda_m$). In this way, the optical signals received downstream of the multimode modal dispersion compensation optical fiber and the multimode transmission optical fiber have minimized modal dispersion (i.e., the cumulative modal dispersion across the optical system is significantly reduced at the multiplex wavelengths).

According to one embodiment, the multimode transmission optical fiber has an optimized graded-index profile such that the modal dispersion for one of the multiplex wavelengths is nearly zero.

According to another embodiment, the optical system includes a plurality of optical sources, each source emitting an optical signal at one of the multiplex wavelengths, a wavelength multiplexer introducing the wavelength multiplexed optical signals into the transmission fiber, and a plurality of input multimode optical fibers connecting each optical source to the multiplexer. Here, the multimode modal dispersion compensation optical fibers can be positioned between the optical sources and the multiplexer (i.e., one or more of the input multimode optical fibers are multimode modal dispersion compensation optical fibers).

According to yet another embodiment, the optical system includes a demultiplexer for receiving the multimode optical signals at the transmission fiber's output and a plurality of optical receivers, each receiver receiving an optical signal at one of the multiplex wavelengths. A plurality of output multimode optical fibers connects each optical receiver to the demultiplexer. Here, the multimode modal dispersion compensation optical fibers can be positioned between the optical receivers and the demultiplexer (i.e., one or more of the output multimode optical fibers are multimode modal dispersion compensation optical fibers).

Moreover, in these embodiments the multiplexer and/or the demultiplexer can retain the spatial distribution of the multiplexed or demultiplexed optical signal modes.

The foregoing, as well as other characteristics and advantages of the invention and the manner in which the same are accomplished, are further specified within the following detailed description and its accompanying drawings.

DETAILED DESCRIPTION

The present invention proposes an optical system that facilitates the transmission of wavelength multiplexed multimode signals to increase the bitrate of multimode telecommunication networks beyond 10 GbE. The present invention further proposes to achieve this increased bitrate without adversely affecting bandwidth.

Multimode modal dispersion compensation optical fibers are employed to compensate the modal dispersion that is induced by a multimode transmission optical fiber at some, and perhaps all, of the multiplex wavelengths.

In one exemplary embodiment, the optical system according to the present invention compensates for the modal dispersion of each multiplex channel upstream of the multiplexer so that the signals received at the output of the multimode transmission fiber have minimized modal dispersion. The transmission system can then ensure a bandwidth greater than or equal to 2000 MHz-km after propagation over 300 meters of multimode fiber and a bandwidth greater than or equal to 4700 MHz-km after propagation over 550 meters of multimode fiber.

Figure 1:
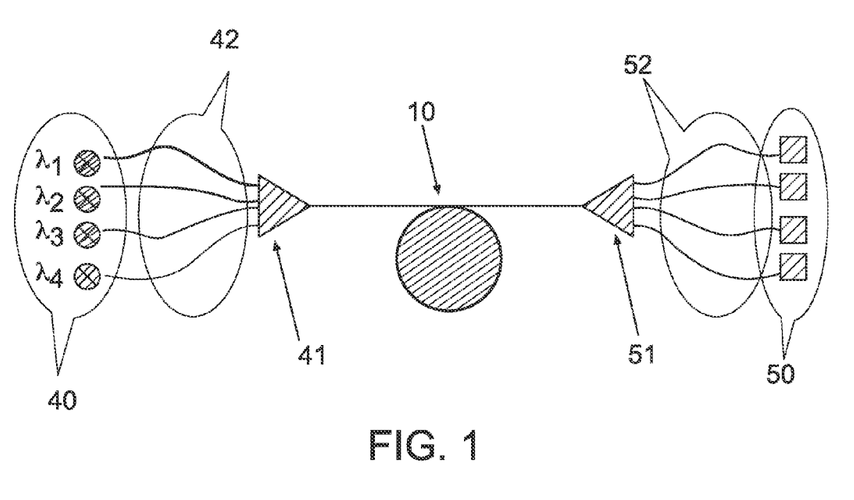
FIG. 1 schematically depicts an exemplary wavelength division multiplexing (WDM) multimode optical system according to the present invention.

FIG. 1 schematically illustrates an exemplary optical system according to the present invention. The optical system of FIG. 1 is a WDM wavelength multiplexed multimode optical transmission system.

FIG. 1 shows a plurality of optical sources 40. Each optical source 40 emits an optical signal at a particular wavelength ($\lambda_1, \lambda_2, \lambda_3, \lambda_4$). By way of example, the optical sources can be laser diodes (LED), surface-emitting lasers (VCSEL), or any other commercially available optical source.

FIG. 1 also shows a transmission multimode optical fiber 10 arranged between a wavelength multiplexer 41 and a wavelength demultiplexer 51. As noted, a multimode optical fiber is typically optimized to have a minimum modal dispersion for a particular wavelength ($\lambda_{optimum}$).

FIG. 1 also shows a plurality of input multimode optical fibers 42 connecting each optical source 40 to the multiplexer 41 and a plurality of output multimode optical fibers 52 connecting the demultiplexer 51 to each optical receiver 50.

The invention proposes that modal dispersion compensation optical fibers, known under the acronym MMDCF for "Multimode Modal Dispersion Compensation Fiber," be introduced into the optical system for the multiplex wavelengths. That is, at least one of these multimode optical fibers has a non-zero modal dispersion for its respective transmission wavelength.

In the following detailed description, given with reference to FIG. 1, reference is made systematically to the multimode modal dispersion compensation fibers (MMDCF) 42 positioned at the input to the multiplexer 41 (i.e., connecting each optical source 40 to the multiplexer 41). To the extent sufficient numbers of multimode modal dispersion compensation optical fibers are positioned upstream of the multiplexer 41, the output multimode optical fibers 52 connecting the demultiplexer 51 to each optical receiver 50 may have profiles optimized for the reception wavelength of the signals that they transmit.

It should be understood, however, that it is within the scope of the present invention to employ multimode modal dispersion compensation fibers (MMDCF) 52 downstream of the multimode transmission optical fiber 10, such as positioned at the output of the demultiplexer 51 to connect one or more optical receivers 50 to the demultiplexer 51.

Similarly, the present invention does not exclude the possibility that some or all of the input optical fibers 42 upstream of the multiplexer 41 and some or all of the output optical fibers 52 downstream of the demultiplexer 51 can be modal dispersion compensation optical fibers 42, 52. Indeed, in accordance with the present invention, various configurations of modal dispersion compensation optical fibers 42, 52 are possible to effect cancellation of modal dispersion induced by the multimode transmission optical fiber (10) at the multiplex wavelengths.

For clarity, the following non-limiting description embraces an optical system in which multimode modal dispersion compensation optical fibers 42 are positioned only between the optical sources 40 and the multiplexer 41. Nonetheless, those having ordinary skill in the art will understand that modal dispersion compensation can take place at the reception stage of the optical system or be distributed between the emission and reception stages. That said, the reference numeral 42 hereinafter denotes both the input multimode optical fibers and the multimode modal dispersion compensation fibers (MMDCF).

Figure 2A:
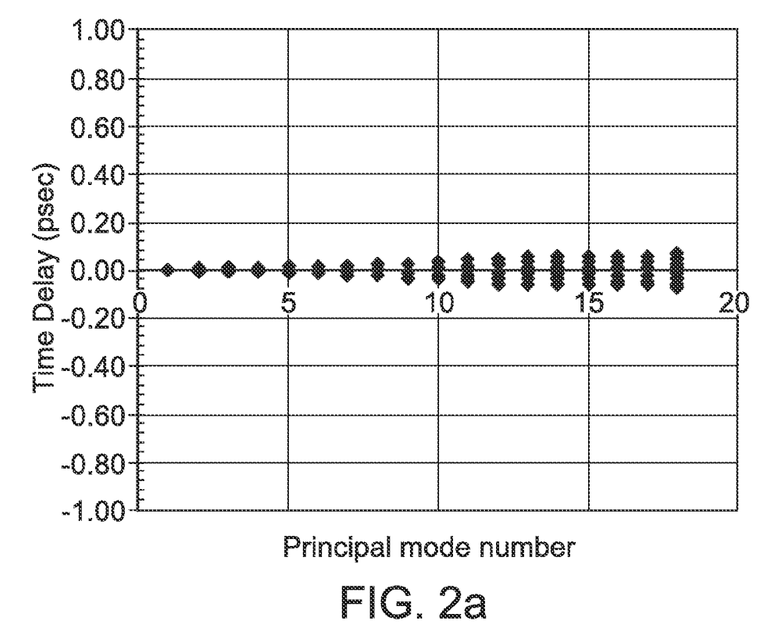
FIG. 2a graphically represents the modal dispersion in an input fiber of the present optical system for an optical signal propagating at the optimum wavelength of the multimode optical fiber of the multiplexed link.
Figure 2B:
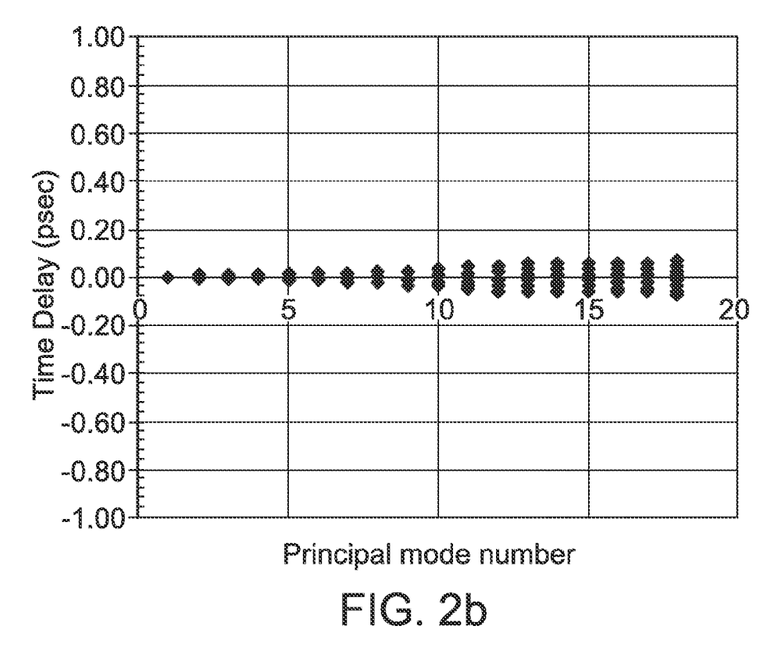
FIG. 2b graphically represents the modal dispersion at the reception of the present optical system for an optical signal propagating at the optimum wavelength of the multimode optical fiber of the multiplexed link.

FIGS. 2a and 2b show graphs illustrating the modal dispersion of the different groups of modes of a light pulse propagating at an optimum wavelength for the multimode transmission optical fiber 10.

Those having ordinary skill in the art will appreciate that one of the optical sources 40 can have an emission wavelength approximately equal to the optimum wavelength ($\lambda_{optimum}$) for which the profile of the transmission fiber 10 has been optimized. In that case, the modal dispersion in the transmission fiber 10 will then be virtually zero.

In this regard, FIG. 2b shows that the modal dispersion is less than 0.2 psec/m for the highest modes (i.e., on an absolute basis). As a result, it is not necessary to compensate for the modal dispersion for this wavelength upstream of the multiplexer 41. The input multimode optical fiber 42 connecting the optical source 40 emitting a light pulse at the transmission fiber's optimum wavelength ($\lambda_{optimum}$) then has a modal dispersion that is also virtually zero (FIG. 2a).

On the other hand, the other optical sources 40 of the optical system will necessarily have an emission wavelength different from the optimum wavelength ($\lambda_{optimum}$) of the transmission fiber 10 so that wavelength multiplexing is possible.

Figure 3A:
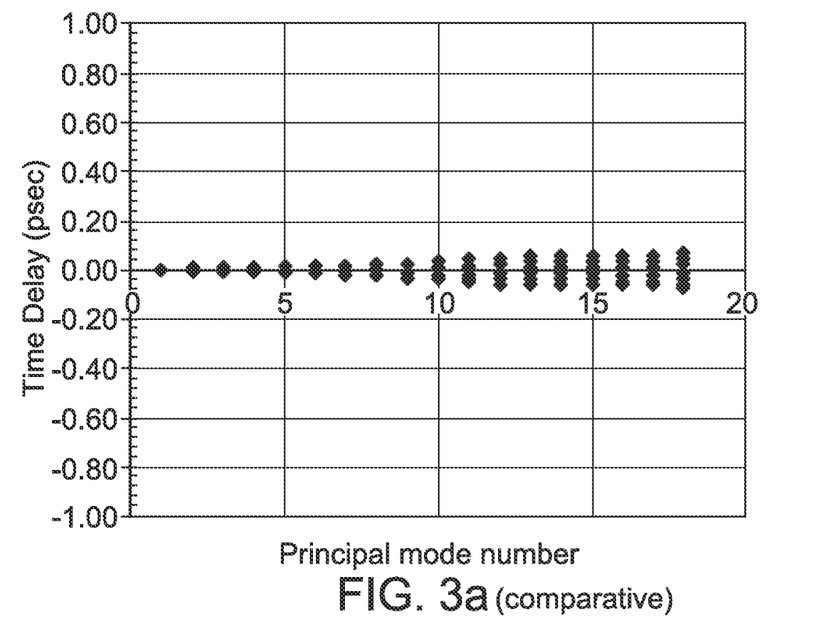
FIG. 3a graphically represents the modal dispersion in an input fiber of a comparative system (i.e., not according to the invention) for an optical signal propagating at a wavelength different from the optimum wavelength of the multimode optical fiber of the multiplexed link.

Comparative FIG. 3a, not according to the invention, therefore shows a graph illustrating the modal dispersion in an input multimode optical fiber 42 of the multiplexer 41. This input multimode fiber 42 is optimized for the emission wavelength of the optical source 40 to which it is connected. The modal dispersion in FIG. 3a is then virtually zero (i.e., less than 0.2 psec/m on an absolute basis).

Figure 3B:
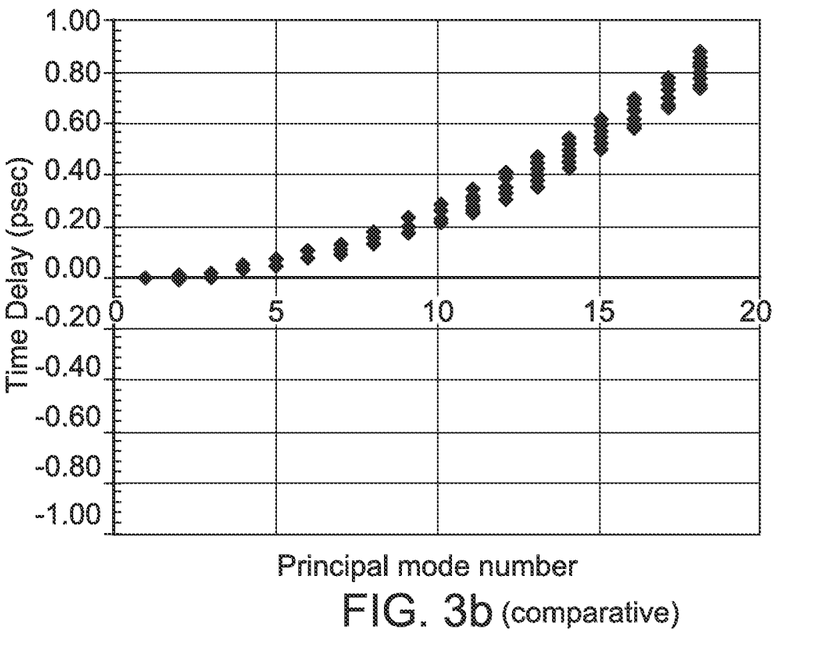
FIG. 3b graphically represents the modal dispersion at the reception of a comparative system (i.e., not according to the invention) for an optical signal propagating at a wavelength different from the optimum wavelength of the multimode optical fiber of the multiplexed link.

Comparative FIG. 3b, also not according to the invention, shows a graph illustrating the modal dispersion at reception of the optical system of an optical signal originating from this optical source. Here, the wavelength is different from the optimum wavelength ($\lambda_{optimum}$) of the transmission optical fiber 10. It can been seen that one channel of the multiplex which does not have the optimum wavelength of the transmission fiber then undergoes a significant modal dispersion, greater than 0.8 psec/m for the higher modes. As a result, a significant bandwidth reduction occurs.

In contrast, the present optical system proposes to introduce a modal dispersion compensation optical fiber 42 between each source 40 and the multiplexer 41 in order to compensate, upstream of the multiplexer 41, for modal dispersion that will be induced in the transmission fiber 10 on those multiplex channels that do not employ the optimum wavelength ($\lambda_{optimum}$) of the transmission fiber 10.

Figure 4A:
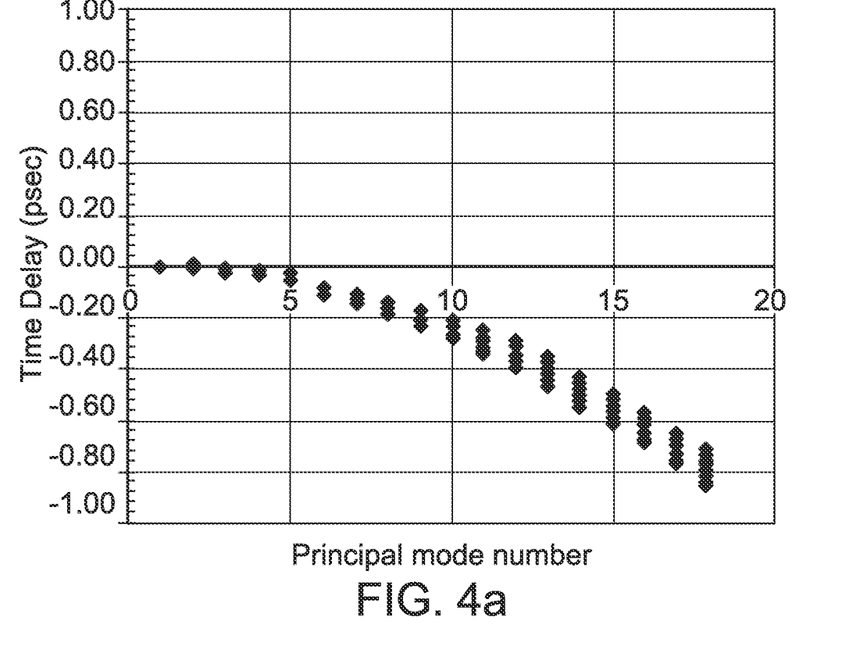
FIG. 4a graphically represents the modal dispersion in an input fiber of the present optical system for an optical signal propagating at a wavelength different from the optimum wavelength of the multimode optical fiber of the multiplexed link.

FIG. 4a shows a graph illustrating the modal dispersion in a modal dispersion compensation optical fiber 42 at the input of the multiplexer 41. This exemplary modal dispersion compensation optical fiber 42 has a controlled modal dispersion such that the multimode optical signal propagation in this modal dispersion compensation optical fiber 42, and then in the transmission fiber 10, has a resultant modal dispersion which is approximately zero at the output of the transmission fiber 10. Stated otherwise, at the particular multiplex wavelength, the multimode modal dispersion compensation optical fiber 42 cancels the modal dispersion induced by the multimode transmission optical fiber 10. Accordingly, the modal dispersion in FIG. 4a is non-zero. Indeed, the modal dispersion induced by the compensation optical fiber 42 is substantial so as to compensate, upstream of the multiplexer 41, the modal dispersion induced in the transmission fiber 10 for the particular multiplex wavelength, which, as noted, is different from the transmission fiber's optimum wavelength ($\lambda_{optimum}$).

Figure 4B:
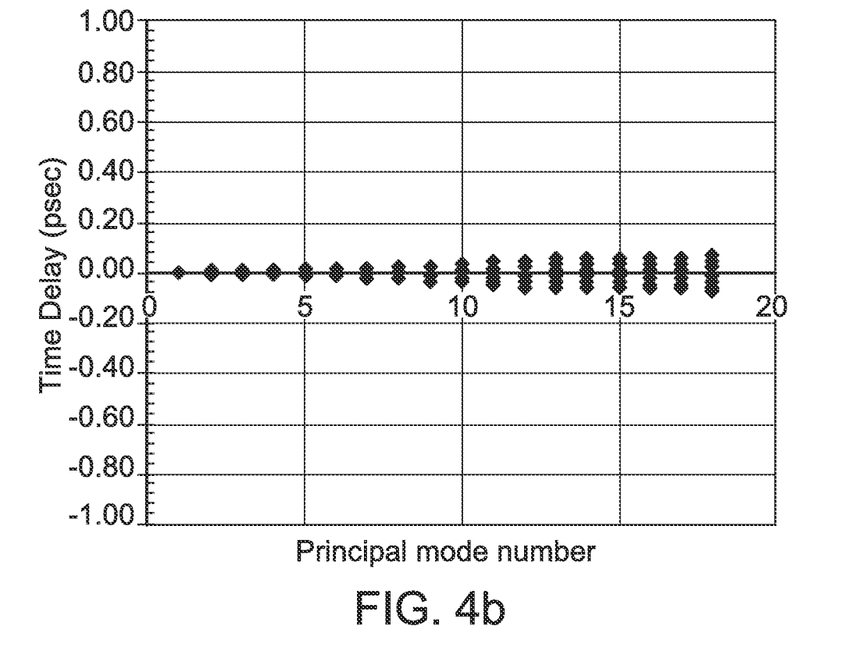
FIG. 4b graphically represents the modal dispersion at the reception of the present optical system for an optical signal propagating at a wavelength different from the optimum wavelength of the multimode optical fiber of the multiplexed link.

FIG. 4b shows a graph illustrating the modal dispersion of an optical signal at the output of the transmission optical fiber 10 for a wavelength that is different from the transmission fiber's optimum wavelength ($\lambda_{optimum}$). It can be seen that for this transmission channel the resulting modal dispersion is corrected, on an absolute basis, to less than 0.2 psec/m (e.g., modal dispersion across the optical system of about 0.1 psec/m or less). In effect, the modal dispersion induced by the compensation optical fiber 42 effectively cancels the subsequent modal dispersion induced by the transmission fiber 10.

The bandwidth of the optical transmission system according to the present invention is thus not reduced, even while it has been possible to increase the bitrate by multiplexing.

The modal dispersion compensation optical fibers 42 can possess graded-index profiles with a value for the alpha parameter optimized so that the modal dispersion at a particular multiplex wavelength is substantially inversely equal, over a particular length of fiber, to the modal dispersion induced by the transmission fiber 10 at that multiplex wavelength. In other words, each of the modal dispersion compensation optical fibers 42 can possess a set index profile that is specifically designed to negate (i.e., cancel), at a specific wavelength of the multiplex, the modal dispersion induced by the transmission fiber 10.

The length of the transmission fiber 10 is typically between about 100 meters and 1000 meters for many applications. The length of the modal dispersion compensation optical fibers 42 is typically between a few meters and a few tens of meters, typically between one meter to 20 meters. The respective lengths of the modal dispersion compensation optical fibers 42, however, are not necessarily the same for each multiplex wavelength to be compensated.

The multiplexer 41 for use in the present optical system typically retains the spatial distribution of the modes of the multiplexed signals. That is, the majority of each mode group coming out from one of the modal dispersion compensation optical fibers 42 is reinjected into the transmission fiber 10 as a single modal group of equivalent order. The modal dispersion compensation introduced on each signal emitted is thus retained at the input of the transmission fiber 10. Such a multiplexer can include an assembly of lenses and semi-transparent mirrors. If the modal dispersion compensation is carried out wholly or partially downstream of the demultiplexer 51, the latter is also chosen so as to avoid introducing mode mixing between the multiplex channels.

As noted, if the modal dispersion compensation is only carried out upstream of the multiplexer 41, each output multimode fiber 52 can then have a profile optimized for the reception wavelength of the signal for which it is intended in order to limit the introduction of modal dispersion at the end of transmission. This optimization of the output multimode fiber profiles 52, however, is not essential if the length of output multimode fiber 52 between the demultiplexer 51 and the optical receiver 50 is short (e.g., less than 10 meters or so). Similarly, if the modal dispersion compensation is only carried out downstream of the demultiplexer 51, each input multimode fiber 42 can possess a profile optimized for the wavelength of the optical source to which it is connected.

The optical transmission system according to the invention allows an increase in the bitrate of Ethernet networks to 40 Gbits, even to 100 Gbits, using, for instance, standard multimode fibers having suitably optimized graded-index profiles as herein described. The optical transmission system according to the invention does not require any optical adapter or any specific algorithm. Indeed, it is uncomplicated and inexpensive to implement.

Of course, the present invention is not limited to the foregoing exemplary embodiments. In particular, it is within the scope of the present invention to employ an optical system in which none of the optical sources 40 emits a light pulse at the optimum wavelength ($\lambda_{optimum}$) of the transmission fiber 10. Here, the multimode transmission optical fiber will induce modal dispersion at each of the multiplex wavelengths, and each modal dispersion compensation optical fiber 42 will then have a non-zero modal dispersion (i.e., to adequately compensate for the transmission fiber's induced modal dispersion).

* * *

This application incorporates by reference in its entirety French application Ser. No. 08/03873 for Fibres Optiques Multimodes, filed Jul. 8, 2008, at the French Patent Office.

This application further incorporates entirely by reference the following commonly assigned patent application publication and patent applications: U.S. Patent Application No. 60/986,737 for a Microbend-Resistant Optical Fiber, filed Nov. 9, 2007, (Overton); U.S. Patent Application No. 61/041,484 for a Microbend-Resistant Optical Fiber, filed Apr. 1, 2008, (Overton); U.S. Patent Application No. 61/112,595 for a Microbend-Resistant Optical Fiber, filed Nov. 7, 2008, (Overton); International Patent Application Publication No. WO 2009/062131 A1 for a Microbend-Resistant Optical Fiber, (Overton); and U.S. patent application Ser. No. 12/267,732 for a Microbend-Resistant Optical Fiber, filed Nov. 10, 2008, (Overton).

This application further incorporates entirely by reference the following commonly assigned patents, patent application publications, and patent applications: U.S. Pat. No. 4,838,643 for a Single Mode Bend Insensitive Fiber for Use in Fiber Optic Guidance Applications (Hodges et al.); U.S. Patent Application Publication No. US2007/0127878 A1 for a Single Mode Optical Fiber (de Montmorillon et al.); U.S. Patent Application Publication No. US2007/0280615 A1 for a Single-Mode Optical Fiber (de Montmorillon et al.); U.S. Pat. No. 7,356,234 for a Chromatic Dispersion Compensating Fiber (de Montmorillon et al.); U.S. Pat. No. 7,483,613 for a Chromatic Dispersion Compensating Fiber (de Montmorillon et al.); U.S. Patent Application Publication No. US2008/0152288 A1 for an Optical Fiber (Flammer et al.); U.S. patent application Ser. No. 12/098,804 for a Transmission Optical Fiber Having Large Effective Area (Sillard et al.), filed Apr. 7, 2008; U.S. patent application Ser. No. 12/418,523 for a Dispersion-Shifted Optical Fiber (Sillard et al.), filed Apr. 3, 2009; U.S. patent application Ser. No. 12/436,423 for a Single-Mode Optical Fiber Having Reduced Bending Losses, filed May 6, 2009, (de Montmorillon et al.); U.S. patent application Ser. No. 12/436,484 for a Bend-Insensitive Single-Mode Optical Fiber, filed May 6, 2009, (de Montmorillon et al.); U.S. Patent Application No. 61/101,337 for a Bend-Insensitive Optical Fiber, filed Sep. 30, 2008, (de Montmorillon et al.); U.S. Patent Application No. 61/112,006 for a Bend-Insensitive Single-Mode Optical Fiber, filed Nov. 6, 2008, (de Montmorillon et al.); and U.S. Patent Application No. 61/112,374 for a Bend-Insensitive Single-Mode Optical Fiber, filed Nov. 7, 2008, (de Montmorillon et al.).

This application further incorporates entirely by reference the following commonly assigned patents, patent application publications, and patent applications: U.S. Pat. No. 5,574,816 for Polypropylene-Polyethylene Copolymer Buffer Tubes for Optical Fiber Cables and Method for Making the Same; U.S. Pat. No. 5,717,805 for Stress Concentrations in an Optical Fiber Ribbon to Facilitate Separation of Ribbon Matrix Material; U.S. Pat. No. 5,761,362 for Polypropylene-Polyethylene Copolymer Buffer Tubes for Optical Fiber Cables and Method for Making the Same; U.S. Pat. No. 5,911,023 for Polyolefin Materials Suitable for Optical Fiber Cable Components; U.S. Pat. No. 5,982,968 for Stress Concentrations in an Optical Fiber Ribbon to Facilitate Separation of Ribbon Matrix Material; U.S. Pat. No. 6,035,087 for an Optical Unit for Fiber Optic Cables; U.S. Pat. No. 6,066,397 for Polypropylene Filler Rods for Optical Fiber Communications Cables; U.S. Pat. No. 6,175,677 for an Optical Fiber Multi-Ribbon and Method for Making the Same; U.S. Pat. No. 6,085,009 for Water Blocking Gels Compatible with Polyolefin Optical Fiber Cable Buffer Tubes and Cables Made Therewith; U.S. Pat. No. 6,215,931 for Flexible Thermoplastic Polyolefin Elastomers for Buffering Transmission Elements in a Telecommunications Cable; U.S. Pat. No. 6,134,363 for a Method for Accessing Optical Fibers in the Midspan Region of an Optical Fiber Cable; U.S. Pat. No. 6,381,390 for a Color-Coded Optical Fiber Ribbon and Die for Making the Same; U.S. Pat. No. 6,181,857 for a Method for Accessing Optical Fibers Contained in a Sheath; U.S. Pat. No. 6,314,224 for a Thick-Walled Cable Jacket with Non-Circular Cavity Cross Section; U.S. Pat. No. 6,334,016 for an Optical Fiber Ribbon Matrix Material Having Optimal Handling Characteristics; U.S. Pat. No. 6,321,012 for an Optical Fiber Having Water Swellable Material for Identifying Grouping of Fiber Groups; U.S. Pat. No. 6,321,014 for a Method for Manufacturing Optical Fiber Ribbon; U.S. Pat. No. 6,210,802 for Polypropylene Filler Rods for Optical Fiber Communications Cables; U.S. Pat. No. 6,493,491 for an Optical Drop Cable for Aerial Installation; U.S. Pat. No. 7,346,244 for a Coated Central Strength Member for Fiber Optic Cables with Reduced Shrinkage; U.S. Pat. No. 6,658,184 for a Protective Skin for Optical Fibers; U.S. Pat. No. 6,603,908 for a Buffer Tube that Results in Easy Access to and Low Attenuation of Fibers Disposed Within Buffer Tube; U.S. Pat. No. 7,045,010 for an Applicator for High-Speed Gel Buffering of Flextube Optical Fiber Bundles; U.S. Pat. No. 6,749,446 for an Optical Fiber Cable with Cushion Members Protecting Optical Fiber Ribbon Stack; U.S. Pat. No. 6,922,515 for a Method and Apparatus to Reduce Variation of Excess Fiber Length in Buffer Tubes of Fiber Optic Cables; U.S. Pat. No. 6,618,538 for a Method and Apparatus to Reduce Variation of Excess Fiber Length in Buffer Tubes of Fiber Optic Cables; U.S. Pat. No. 7,322,122 for a Method and Apparatus for Curing a Fiber Having at Least Two Fiber Coating Curing Stages; U.S. Pat. No. 6,912,347 for an Optimized Fiber Optic Cable Suitable for Microduct Blown Installation; U.S. Pat. No. 6,941,049 for a Fiber Optic Cable Having No Rigid Strength Members and a Reduced Coefficient of Thermal Expansion; U.S. Pat. No. 7,162,128 for Use of Buffer Tube Coupling Coil to Prevent Fiber Retraction; U.S. Pat. No. 7,515,795 for a Water-Swellable Tape, Adhesive-Backed for Coupling When Used Inside a Buffer Tube (Overton et al.); International Patent Application Publication No. WO 2007/013923 A2 for a Grease-Free Buffer Optical Fiber Buffer Tube Construction Utilizing a Water-Swellable, Texturized Yarn (Overton et al.); European Patent Application Publication No. 1,921,478 A1, for a Telecommunication Optical Fiber Cable (Tatat et al.); U.S. Patent Application Publication No. US2007/0183726 A1 for an Optical Fiber Cable Suited for Blown Installation or Pushing Installation in Microducts of Small Diameter (Nothofer et al.); U.S. Patent Application Publication No. US 2008/0037942 A1 for an Optical Fiber Telecommunications Cable (Tatat); U.S. Patent Application Publication No. US2008/0145010 A1 for a Gel-Free Buffer Tube with Adhesively Coupled Optical Element (Overton et al.); U.S. Patent Application Publication No. US2008/0181564 A1 for a Fiber Optic Cable Having a Water-Swellable Element (Overton); U.S. Patent Application Publication No. US2009/0041414 A1 for a Method for Accessing Optical Fibers within a Telecommunication Cable (Lavenne et al.); U.S. Patent Application Publication No. US2009/0003781 A1 for an Optical Fiber Cable Having a Deformable Coupling Element (Parris et al.); U.S. Patent Application Publication No. US2009/0003779 A1 for an Optical Fiber Cable Having Raised Coupling Supports (Parris); U.S. Patent Application Publication No. US2009/0003785 A1 for a Coupling Composition for Optical Fiber Cables (Parris et al.); U.S. patent application Ser. No. 12/391,327 for a Buffer Tube with Hollow Channels, filed Feb. 24, 2009, (Lookadoo et al.); and U.S. patent application Ser. No. 12/466,965 for an Optical Fiber Telecommunication Cable, filed May 15, 2009.

* * *

In the specification and/or figures, typical embodiments of the invention have been disclosed. The present invention is not limited to such exemplary embodiments. The figures are schematic representations and so are not necessarily drawn to scale. Unless otherwise noted, specific terms have been used in a generic and descriptive sense and not for purposes of limitation.

The invention claimed is:

1. An optical system, comprising:
a multimode transmission optical fiber that is capable of transmitting wavelength multiplexed optical signals at distinct multiplex wavelengths, the multimode transmission optical fiber inducing modal dispersion at at least some of the multiplex wavelengths;
a wavelength multiplexer for introducing the wavelength multiplexed optical signals into the multimode transmission optical fiber, wherein the wavelength multiplexer retains the spatial distribution of the modes of the wavelength multiplexed optical signals; and
a plurality of multimode modal dispersion compensation optical fibers, each multimode modal dispersion compensation optical fiber being capable of transmitting one of the multiplex wavelengths;
wherein the plurality of multimode modal dispersion compensation optical fibers compensates modal dispersion induced by the multimode transmission optical fiber such that, at the multiplex wavelengths, the compensated modal dispersion is, on an absolute basis, less than 0.2 psec/m;
wherein, at the multiplex wavelengths, the optical system ensures a bandwidth greater than or equal to 2000 MHz-km after propagation over 300 meters;
wherein, at the multiplex wavelengths, the optical system ensures a bandwidth greater than or equal to 4700 MHz-km after propagation over 550 meters; and
wherein the optical system ensures a bitrate greater than 10Gb/s.

2. The optical system according to claim 1, wherein the multimode modal dispersion compensation optical fibers possess respective index profiles designed to offset the modal dispersion induced by the multimode transmission optical fiber at the multiplex wavelengths.

3. The optical system according to claim 1, wherein each multimode modal dispersion compensation optical fiber induces, at a respective multiplex wavelength, modal dispersion that is substantially inversely equal to the modal dispersion induced by the multimode transmission optical fiber.

4. The optical system according to claim 1, wherein the multimode transmission optical fiber has a graded-index profile that induces substantially no modal dispersion at one of the multiplex wavelengths.

5. The optical system according to claim 1, wherein:
the multimode transmission optical fiber induces modal dispersion at each of the multiplex wavelengths; and
the plurality of multimode modal dispersion compensation optical fibers compensates modal dispersion induced by the multimode transmission optical fiber to achieve absolute modal dispersion of less than 0.2 psec/m at each of the multiplex wavelengths.

6. The optical system according to claim 1, comprising:
a plurality of optical sources, each optical source being capable of emitting optical signals at one of the multiplex wavelengths; and
a plurality of input multimode optical fibers connecting each optical source to the wavelength multiplexer.

7. The optical system according to claim 6, wherein one or more of the input multimode optical fibers are multimode modal dispersion compensation optical fibers.

8. The optical system according to claim 1, comprising a wavelength demultiplexer for receiving the wavelength multiplexed optical signals from the multimode transmission optical fiber.

9. The optical system according to claim 8, comprising:
a plurality of optical receivers, each optical receiver being capable of receiving optical signals at one of the multiplex wavelengths; and
a plurality of output multimode optical fibers connecting each optical receiver to the wavelength demultiplexer.

10. The optical system according to claim 9, wherein one or more of the output multimode optical fibers are multimode modal dispersion compensation optical fibers.

11. The optical system according to claim 8, wherein the wavelength demultiplexer retains the spatial distribution of the modes of the demultiplexed optical signals.

12. The optical system according to claim 1, wherein the multimode transmission optical fiber has a length of between about 100 meters and 1000 meters.

13. The optical system according to claim 1, wherein each of the multimode modal dispersion compensation optical fibers has a length of between about one meter and 20 meters.

14. A wavelength multiplexed optical system, comprising:
a multimode transmission optical fiber for transmitting wavelength multiplexed optical signals at distinct multiplex wavelengths, the multimode transmission optical fiber having a first end and a second end;
a wavelength multiplexer for introducing the wavelength multiplexed optical signals into the first end of the multimode transmission optical fiber in a way that retains the spatial distribution of the modes of the wavelength multiplexed optical signals;
a wavelength demultiplexer for receiving the wavelength multiplexed optical signals from the second end of the multimode transmission optical fiber in a way that retains the spatial distribution of the modes of the wavelength demultiplexed optical signals; and
a multimode modal dispersion compensation optical fiber in optical communication with the multimode transmission optical fiber;
wherein, in transmitting wavelength multiplexed optical signals at a particular multiplex wavelength ($\lambda_m$), the multimode transmission optical fiber induces modal dispersion;
wherein, for substantially all propagating modes at the particular multiplex wavelength ($\lambda_m$), the multimode modal dispersion compensation optical fiber, on an absolute basis, compensates to less than 0.2 psec/m the modal dispersion induced by the multimode transmission optical fiber;
wherein, for the multiplex wavelengths, the optical system ensures a bandwidth greater than or equal to 2000 MHz-km after propagation over 300 meters;
wherein, for the multiplex wavelengths, the optical system ensures a bandwidth greater than or equal to 4700 MHz-km after propagation over 550 meters; and wherein the optical system ensures a bitrate greater than 10Gb/s.

15. A wavelength multiplexed optical system according to claim 14, comprising:
a plurality of optical sources, each optical source being capable of emitting wavelength multiplexed optical signals at one of the multiplex wavelengths; and
a plurality of input multimode optical fibers connecting each optical source to the wavelength multiplexer, wherein one of the input multimode optical fibers is the multimode modal dispersion compensation optical fiber that offsets the modal dispersion induced by the multimode transmission optical fiber.

16. A wavelength multiplexed optical system according to claim 14, comprising:
a plurality of optical receivers, each optical receiver being capable of receiving one of the wavelength demultiplexed optical signals from the wavelength demultiplexer; and
a plurality of output multimode optical fibers connecting each optical receiver to the wavelength demultiplexer, wherein one of the output multimode optical fibers is the multimode modal dispersion compensation optical fiber that offsets the modal dispersion induced by the multimode transmission optical fiber.

17. An optical system, comprising:
a multimode transmission optical fiber that is capable of transmitting wavelength multiplexed optical signals at distinct multiplex wavelengths, the multimode transmission optical fiber inducing modal dispersion at at least some of the multiplex wavelengths;
a plurality of optical sources, each optical source being capable of emitting optical signals at one of the multiplex wavelengths over the entire core of a multimode optical fiber;
a wavelength multiplexer for introducing the wavelength multiplexed optical signals into the multimode transmission optical fiber, wherein the wavelength multiplexer retains the spatial distribution of the modes of the wavelength multiplexed optical signals;
a plurality of input multimode optical fibers connecting each optical source to the wavelength multiplexer, wherein each input multimode optical fiber is configured to receive over its substantially entire core emitted optical signals at one of the multiplex wavelengths emitted by its corresponding optical source;
a wavelength demultiplexer for receiving the wavelength multiplexed optical signals from the multimode transmission optical fiber, wherein the wavelength demultiplexer retains the spatial distribution of the modes of the demultiplexed optical signals; and
a plurality of multimode modal dispersion compensation optical fibers, each multimode modal dispersion compensation optical fiber being capable of transmitting one of the multiplex wavelengths;
wherein the plurality of multimode modal dispersion compensation optical fibers compensates modal dispersion induced by the multimode transmission optical fiber such that, for substantially all propagating modes at the multiplex wavelengths, the compensated modal dispersion is, on an absolute basis, less than 0.2 psec/m;
wherein, at the multiplex wavelengths, the optical system ensures a bandwidth greater than or equal to 2000 MHz-km after propagation over 300 meters;
wherein, at the multiplex wavelengths, the optical system ensures a bandwidth greater than or equal to 4700 MHz-km after propagation over 550 meters; and
wherein the optical system ensures a bitrate greater than 10Gb/s.

18. The optical system according to claim 17, wherein the plurality of optical sources consists of vertical-cavity surface-emitting lasers (VCSELs).

19. The optical system according to claim 1, wherein the plurality of multimode modal dispersion compensation optical fibers compensates modal dispersion induced by the multimode transmission optical fiber such that, for substantially all propagating modes at the multiplex wavelengths, the compensated modal dispersion is, on an absolute basis, less than 0.2 psec/m.

20. The optical system according to claim 1, wherein the plurality of multimode modal dispersion compensation optical fibers compensates modal dispersion induced by the multimode transmission optical fiber such that, for at least ten principal mode groups at the multiplex wavelengths, the compensated modal dispersion is, on an absolute basis, less than 0.2 psec/m.

* * * * *